United States Patent Office 3,143,487
Patented Aug. 4, 1964

3,143,487
HYDROGEN AS A PROMOTER FOR THE SYNTHE-
SIS OF HALOGENATED THIOETHERS
Paul F. Warner, Phillips, Tex., assignor to Phillips
Petroleum Company, a corporation of Delaware
No Drawing. Filed June 28, 1962, Ser. No. 205,840
9 Claims. (Cl. 204—158)

This invention relates to the preparation of halogenated thioethers. More particularly, it relates to the preparation of halogenated thioethers in the presence of a novel reaction promoter.

The preparation of thioethers by reacting mercaptans or halogenated mercaptans with organic compounds containing ethylenic linkages is well known in the art. When this reaction is carried out photochemically in the presence of ultraviolet radiation, the addition of the sulfhydryl group, —SH, to the unsaturated compound occurs in an abnormal manner, that is, contrary to the course suggested by the Markownikoff Rule (the sulfhydryl group becomes affixed to the unsaturated carbon atoms holding the most hydrogen atoms) and the hydrogen atom becomes affixed to that unsaturated carbon atom carrying the lesser number of hydrogen atoms. This abnormal conversion reaction is well known in the art and has been used to form thioethers, such as those used in insecticide and repellent compositions, etc. However, the conversion of the unsaturated compound by this reaction is often of a low order, and many unsaturated compounds, such as ethylene, are not readily converted while others require an induction period before any appreciable conversion results. Also, the yields of thioethers when prepared according to this known photochemical process have not been as great as desired.

It is an object of this invention to provide a novel method for the preparation of halogenated thioether compounds.

It is another object of the invention to provide a novel method for the preparation of thioethers by reacting mercaptans or halogenated mercaptans with ethylenically unsaturated compounds in the presence of ultraviolet radiation and a novel reaction promoter.

It is another object to increase the rate of conversion of ethylenically unsaturated organic compounds in the reaction of the same with mercaptans or halogenated mercaptans in the presence of ultraviolet radiation.

Still another object is to increase the yield of thioethers produced in the reaction between unsaturated organic compounds and mercaptans or halogenated mercaptans.

These and other objects and advantages will be apparent to those skilled in the art from the following disclosure and claims.

These objects are broadly accomplished by contacting an ethylenically unsaturated organic compound with a mercaptan in a reaction zone in the presence of hydrogen, at least one of said reactants being a halogenated compound, and subjecting the reactants to the influence of light rays having wave lengths below about 3,000 Angstrom units.

It has been found that the presence of hydrogen in a reaction mixture composed of equimolar quantities of mercaptans or halogenated mercaptans and an unsaturated organic compound during irradiation with ultraviolet light accelerates the reaction. It has been discovered that disulfides are serious reaction inhibitors in the ultraviolet process. Any mercaptan exposed to air for an appreciable length of time contains disulfides in greater or lesser amounts depending on the time and conditions of exposure to air. It has now been found that the bubbling of hydrogen through a disulfide during exposure to an ultraviolet light produces mercaptan. Therefore, it has been theorized that the action of the hydrogen in the instant invention is to reduce the disulfides already present and to prevent formation of disulfides during the actual reaction which is carried out in air as the atmosphere. However, I do not wish to be restrained by any theory concerning the mechanism of the claimed process.

The unsaturated organic compounds to which the invention is particularly applicable include hydrocarbons containing one or more olefinic and/or acetylenic linkages. The invention is particularly applicable to the reaction of a mercaptan with partially unsaturated hydrocarbons having unsaturated linkage of aliphatic character, preferably terminal unsaturation, and especially with halogenated unsaturated hydrocarbons in which the terminal carbon atom is unsaturated and carries a greater number of hydrogen atoms than the adjoining unsaturated carbon atoms. When unsaturates are reacted with the mercaptan according to the process of this invention, the reaction product predominates in or consists of halogenated primary thioethers.

The ethylenically unsaturated organic compounds which may be reacted with mercaptans or halogenated mercaptans according to this invention include those with one or more ethylenic linkages although those generally applicable have a total of from 2 to 20 atoms per molecule and 1 to 3 ethylenic linkages. Such unsaturated compounds include acylic and cyclic olefins and the like. Representative unsaturated compounds useful in the practice of this invention include ethylene, propylene, butene-1, butene-2, isobutene, pentene-1, pentene-2, hexene-1, heptene-1, octene-1, decene-1, dodecene-1, pentadecene-1, heptadecene-1, eicosene-1, isopentene-1, 4-methyl-1-pentene, 3,6-dimethyl-1-heptene, 7-methyl-4-nonene, 4-methyl-5-butyl-4-decene, 1,4-diphenyl-2-butene, 3-cyclohexyl-6-eicosene, 4,4 - dimethyl - 1 - pentene, 4-methyl-2-pentene, 2,4,4-trimethyl-2-pentene, cyclopentene, 2-ethylcyclopentene, 2,5-diethylcyclopentene, cyclohexene, 3-ethylcyclohexene, 2-ethyl-4-methyl-5-heptyl-6-butylcyclohexene, cycloheptene, cyclooctene, 4-vinylcyclohexene, 3-ethyl-5-vinylcyclohexene, 4-(1-cyclohexenyl) - butene-1,4-vinylcyclopentene, 1-methyl-2-dodecyl-4-vinylcyclopentene, 1,5,9-cyclododecatriene, and the like.

In addition to the above-named unsaturated hydrocarbons, the process of the invention can be employed to effect an increased rate of reaction of a mercaptan with ethylenically unsaturated compounds containing non-hydrocarbon groups. For example, the above-named ethylenically unsaturated hydrocarbons can be substituted by halogens, particularly chlorine and bromine. Some specific examples of compounds of this type are vinyl chloride, vinyl bromide, allyl chloride, allyl bromide, dodecenyl chloride, 2-chloroeicosene-2, and the like.

Any sufficiently stable mercaptan, including a halogenated mercaptan, is suitable as a reactant to be employed in the photochemical addition thereof to the defined class of unsaturated organic compounds where at least one of the reactants is a halogenated compound. A suitable mercaptan may contain one or more sulfhydryl groups or radicals and be of alkyl, aralkyl, alkenyl, aralkenyl, or aryl character and comprise the mercapto radical joined to an aliphatic or aromatic carbon atom. In the majority of cases, it is preferable to employ the normal or iso-alkyl chain mercaptans of primary, secondary, or tertiary character, particularly those contained in or derived from petroleum and petroleum products. The methyl, ethyl, butyl, amyl, hexyl, heptyl, octyl, and similar mercaptans as well as their homologs and halogenated substituted products are employable with excellent results.

Another group of mercaptans which are employable as one of the two reactants comprises or includes the dimercaptans and particularly the polymethylene dimercaptans of the general formula $HS(CH_2)_nSH$. This group of mercaptans may be reacted with, for example, halogenated aliphatic hydrocarbons containing a plurality of unsaturated linkages, to produce halogenated thioethers having a high molecular weight. A particularly suitable group of halogenated unsaturated organic compounds which may be employed with these dimercaptans includes the halogenated unsaturated compounds containing unsaturated linkages of aliphatic character in alpha and omega positions (that is, in terminal positions). Due to the abnormal addition reaction, the resulting products predominate in or consists of halogenated mercaptothioethers and thioethers and halogenated polythioethers. For example, 2-chloro-butadiene-1,3 may be thus reacted with normal tetramethylene dimercaptan to produce normal halogenated polyalkenyl thiols having the general formula R—S—R'—SR wherein R' is a monochlorinated normal tetramethylene radical and each R represents a mercapto and/or thioether derivative of reactants. Instead of employing straight chain, particularly halogenated unsaturated, hydrocarbons it is also possible to use branched chain halogenated compounds provided they contain one or more unsaturated linkages of aliphatic character. The polyunsaturated halogenated inorganic compounds may or may not be unsaturated in terminal positions.

Typical and representative of the various thioethers which can be produced according to this invention include diethyl thioether, dipropyl thioether, dicyclohexyl thioether, dibutyl thioether, dipentadecyl thioether, 6-chlorohexyl ethyl sulfide, 8-chlorooctyl butyl sulfide, 4-chloropentyl-3-chloropropylsulfide, 9-chlorodecyl-5-chloropentyl sulfide and the like.

Although the reaction described herein can be conducted by using any source of light radiation containing the whole range of ultraviolet radiations, i.e., wave lengths in the range of 100 to 3800 Angstrom units, ultraviolet radiations having wave lengths below about 3000 Angstrom units are preferred. The amount of radiation can vary over a wide range and will be dependent upon many factors, such as the particular reactants used and the amount thereof, the source of radiation and other considerations known to the art. Generally, however, the rate of ultraviolet radiation, expressed in terms of REP (roentgen equivalent physical) per hour will be in the range between $1 \times 10^3$ to $1 \times 10^{10}$, and the total radiation or dosage will generally be in the range between $1 \times 10^5$ and $1 \times 10^{11}$ REP. Any suitable source of radiation providing wave lengths in the ultraviolet range can be used, including such common sources as mercury arc lamps, and hydrogen discharge tubes. The particular reaction vessel used should be transparent in whole or part, to ultraviolet radiation of the desired wave lengths, and materials such as Pyrex, Vycor and quartz are employable.

Although it is preferred to use light rays concentrated in ultraviolet radiations, it is within the scope of the invention to employ sunlight or other forms of light containing ultraviolet radiations. It is also within the scope of the invention to employ a photo-sensitizer, such as acetone, which can be dissociated by longer wave length radiations.

The reaction of this invention can be carried out in a manner like that of the prior art, and may be effected in a batch, intermittent, or continuous manner. The reaction temperature is variable over a wide range, and generally will be within —50 and 300° F., although the upper limit is dictated only by pressure, since some of the lower molecular weight unsaturated reactants will have an extremely high vapor pressure which will entail the use of high pressure vessels if the reaction is carried out at temperatures outside of this range. The pressure at which the reaction is carried out will also vary and generally will be the equilibrium pressure of the reaction mixture at the chosen reaction temperature. Generally speaking, the reaction times will also vary and can be carried out, for example, within the range between 1 and 50 hours, preferably between 1 and 10 hours.

After the reaction is completed, the products of reaction can be recovered by well-known means. For example, gases can be recovered or released to the atmosphere and the liquid product fractionated, distilled, crystallized, or subjected to various other separation and recovery procedures to obtain the desired products.

The amount of hydrogen promoter used in this invention is variable over a wide range and is dependent upon a number of factors, such as the particular unsaturated compound used as the reactant as well as the mercaptan, the amount of ultraviolet radiation, the product desired, the type of reaction vessel, and the like. Generally, the amount of hydrogen promoter employed is that amount sufficient to promote the reaction and increase the conversion of the unsaturated compound. For most applications, the amount of hydrogen promoter is in the range of 0.01 to 10 moles of hydrogen per mol of mercaptan, preferably 0.1 to 0.5 mols of hydrogen per mol of mercaptan. It has generally been found most satisfactory to bubble the hydrogen through the reaction mixture for a period of time sufficient to provide the desired conversion.

Similarly, the ratio of the mercaptan to the unsaturated hydrocarbon organic compound will vary, and generally for most applications, there will be approximately equimolar quantities of either reactant although this will depend on the individual reactants.

The following example further illustrates the objects and advantages of the invention, but it should be understood that the various ingredients or reactants, amounts, temperatures, pressures, and other conditions recited in the example should not be construed so as to unduly limit the invention.

*Specific Example*

A series of runs was conducted in which a feed mixture of distilled and "as received" n-octyl mercaptan was reacted with allyl chloride in a laboratory loop-type reactor (one leg containing a quartz well) in the presence of ultraviolet light. A control run was made without hydrogen with both mercaptans and these runs were compared to runs where hydrogen was bubbled through the reaction mixture composed of equimolar quantities of n-octyl mercaptan and allyl chloride. The following tabulation illustrates that the hydrogen increased the reaction rate in both instances. It is to be noted that the "as received" mercaptan had a slow conversion rate at first but had almost caught up with the distilled mercaptan at the end of two hours. It is thought that the "as received" sample contained more disulfide than the distilled sample and that a longer time was required for the hydrogen to reduce the disulfide.

| Feedstock Preparation Gas Bubbled through Reaction Mixture | Conversion at Reaction Time Shown, Weight percent | | | |
|---|---|---|---|---|
| | As Received | | Distilled Mercaptan | |
| | None | $H_2$ | None | $H_2$ |
| Reaction Time, hrs.: | | | | |
| 0.5 | 45.2 | 40.5 | 46.0 | 61.5 |
| 1.0 | 64.2 | 75.6 | 62.7 | 83.0 |
| 2 | 74.5 | 85.7 | 75.6 | 89.5 |
| 3 | | | | 93.0 |
| 4 | 86.5 | 93.0 | | |
| 5 | | | | |
| 6 | 89.6 | 94.5 | | |
| 7 | | | | |
| 8 | 93.7 | 96.7 | | |

While certain examples, structures, compositions and process steps have been described for purposes of illustration, the invention is not limited to these. Variations and modification within the scope of the disclosure and the claims can readily be effected by those skilled in the art.

I claim:

1. A process for producing halogenated thioethers comprising contacting an organic compound containing at least one unsaturated linkage between two carbon atoms of aliphatic character with a mercaptan in a reaction zone in the presence of hydrogen, at least one of said reactants being a halogenated compound, and subjecting the reactants to the influence of light rays having wave lengths below about 3000 Angstrom units, said hydrogen being present in an amount sufficient to increase the reaction rate.

2. A process for the production of halogenated thioethers comprising contacting a halogenated organic compound containing at least one unsaturated linkage between two carbon atoms of aliphatic character with a mercaptan in a reaction zone in the presence of hydrogen, and subjecting the reactants to the influence of light rays having wave lengths below about 3000 Angstrom units, said hydrogen being present in an amount sufficient to increase the reaction rate.

3. A process for producing halogenated thioethers comprising contacting the halogenated organic compound containing at least one unsaturated linkage between two carbon atoms of aliphatic character with a halogenated mercaptan in a reatcion zone in the presence of hydrogen, and subjecting the reactants to the influence of light rays having wave lengths below about 3000 Angstrom units, said hydrogen being present in an amount sufficient to increase the reaction rate.

4. A process for producing halogenated thioethers comprising contacting an organic compound containing at least one unsaturated linkage between two carbon atoms of aliphatic character with a halogenated mercaptan in a reaction zone in the presence of hydrogen, and subjecting the reactants to the influence of light rays having wave lengths below about 3000 Angstrom units, said hydrogen being present in an amount sufficient to increase the reaction rate.

5. A process for producing halogenated thioethers comprising contacting a compound selected from the class consisting of unsaturated organic compounds and partially halogenated derivatives thereof, which compounds contain at least one unsaturated linkage between two carbon atoms of aliphatic character, with a compound selected from the class consisting of mercaptans and halogenated mercaptans, at least one of said reactants being a halogenated compound, in the presence of hydrogen, and subjecting the reactants to the deliberate influence of ultraviolet radiations having wave lengths of below 3000 Angstrom units, said hydrogen being bubbled through said reactants in an amount sufficient to increase the reaction rate.

6. The process of claim 5 wherein said amount of hydrogen is in the range of 0.01 to 10 mols of hydrogen per mol of mercaptan.

7. The process of claim 5 wherein the temperature maintained during the reaction is in the range of —50 to about 300° F. and the pressure is sufficient to maintain liquid phase conditions.

8. A process for producing 3-chloropropyl-n-octyl sulfide comprising contacting allyl chloride with n-octyl mercaptan in a reaction zone, bubbling hydrogen into the thus formed reaction mixture in an amount sufficient to increase the reaction rate and subjecting the reactants to the influence of light rays having wave lengths below about 3000 Angstrom units.

9. A process for producing 3-chloropropyl-n-octyl sulfide comprising contacting allyl chloride with n-octyl mercaptan in a reaction zone at a temperature in the range of —50 to 300° F. and a pressure in the range of atmospheric to 1000 atmospheres while bubbling hydrogen in an amount in the range of 0.01 to 10 mols of hydrogen per mol of mercaptan through the reactants in an amount sufficient to increase the reaction rate, and subjecting the reactants to the influence of light rays having wave lengths below about 3000 Angstrom units.

References Cited in the file of this patent

UNITED STATES PATENTS 2,392,295   Rust et al. _____ Jan. 1, 1946